April 21, 1970  C. SAVAGE  3,507,361

VEHICLE SYSTEM HAVING LOST-MOTION CONTROL DEVICE

Filed Dec. 14, 1966 3 Sheets-Sheet 1

WITNESSES
Theodore F. Wrobel
James F. Young

INVENTOR
Conwell Savage
BY P.L. Freedman
ATTORNEY

United States Patent Office 3,507,361
Patented Apr. 21, 1970

3,507,361
VEHICLE SYSTEM HAVING LOST-MOTION
CONTROL DEVICE
Conwell Savage, New York, N.Y., assignor to Westinghouse Electric Corporation, Pittsburgh, Pa., a corporation of Pennsylvania
Filed Dec. 14, 1966, Ser. No. 601,706
Int. Cl. B66b 1/24
U.S. Cl. 187—29       10 Claims

ABSTRACT OF THE DISCLOSURE

An elevator car is arranged to move in a path having first, second and third parts. It is controlled in part by a floor selector which is driven through a coupling comprising a disc having a spiral groove connecting two spaced sockets for receiving a pin. The pin and the disc are mounted for rotation about a common center. When the elevator car is in the first and second parts of its path the pin is respectively in one of the two sockets to drive the selector. When the car is in the third part the pin moves through the spiral groove while the selector remains stationary. The third part may be an express zone.

---

This invention relates to a lost-motion control device, and has particular relation to an express-zone vehicle system having a lost-motion landing or floor selector drive.

The invention is applicable to vehicles arranged for movement along horizontal, inclined or vertical paths such vehicles may be arranged to travel in express zones wherein the vehicles do not stop. The invention is particularly applicable to elevator systems and will be described as applied to such a system.

An elevator car arranged to run through an express zone may serve a group of landings or floors located on one side of the express zone. In some cases, the elevator car is arranged to serve a group of landings or floors located on each side of the express zone.

It is conventional practice to employ a landing or floor selector for the purpose of controlling or supervising the operation of an elevator car. Such a selector may have one or more carriages designed to move in accordance with car motion. The speed of a selector carriage is proportional to, but much smaller than, the speed of the associated elevator car.

When an elevator car is in an express zone, movement of a selector carriage serves no useful function and adds to the size, weight and cost of the selector. For this reason it has been proposed to maintain the carriage stopped while the elevator car is in its express zone. Such stopping of a selector carriage is discussed in the Bouton patent 2,482,458. In the Bouton patent the express zone extends between the first floor and the fifteenth floor of a building. The elevator car associated with the express zone is arranged to serve the fifteenth to twentieth floors.

In accordance with my invention a lost-motion device is provided which has a driving member having three parts or ranges of movement. The lost-motion device also has a driven member which is accurately coupled to the driving member in first and second ones of the parts or ranges of movement and which is effectively decoupled from the driving member in a third part or range of movement which lies intermediate the first and second parts.

As applied to a landing or floor selector of a vehicle such as an elevator car serving two groups of landings located on opposite sides of an express zone, the driven member is moved proportionally to motion of the elevator car. When the elevator car is in the lower group of landings or in the upper group of landings the driving member is in the first part or the second part respectively of its movement and is accurately coupled to the driven member. Since the position of the driven member represents the position of the elevator car, it may be employed in controlling or supervising the movement of a car. When the elevator car is in its express zone, the driving and driven members are effectively uncoupled and the driven member is maintained in stopped condition. This materially reduces the size and cost of the floor selector.

In a preferred embodiment of the invention one of the members comprises a male coupling unit and the other member comprises a female coupling unit rotatable about a common axis. The female coupling unit has a pair of spaced socket areas for snugly receiving the male unit. These socket areas are connected by a spiral groove for guiding the male unit between the socket areas while the elevator car is in its express zone.

It is therefore an object of the invention to provide an improved lost-motion device.

It is another object of the invention to provide an improved vehicle system having an express zone and having a landing selector of reduced size and cost.

It is also an object of the invention to provide an elevator system for serving two groups of landings located on opposite sides of an express zone with a floor selector carriage arranged to move in accordance with movement of an elevator car while the car is located in each of the groups of landings, the carriage being maintained in stopped condition during transit of the elevator car through the express zone.

Other objects of the invention will be apparent from the following description taken in conjunction with the accompanying drawings, in which.

Figure 1:
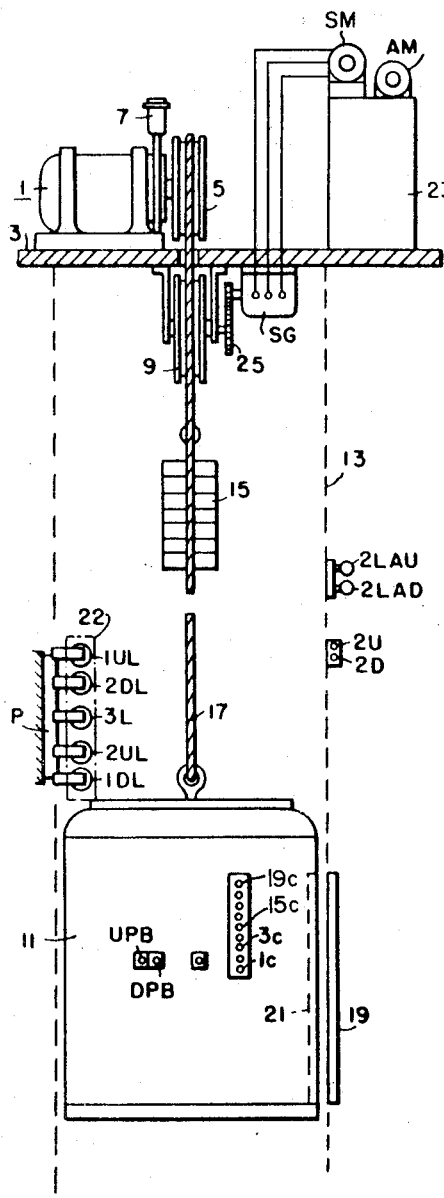
FIGURE 1 is a view in side elevation with parts broken away of an elevator system embodying the invention.

In order to simplify the presentation of the invention, the invention will be described as applied to an elevator system similar to that shown in my Patent 2,657,765 which issued Nov. 3, 1953. The conventions employed in my aforesaid patent also will be here employed. In my patent the elevator car is arranged to serve a building having nine landings or floors. These landings are successively arranged and are all served by the same elevator car. In the present case, the elevator car is assumed to serve a building having nineteen floors. The elevator car is assumed to serve two groups of landings or floors located on opposite sides of an express zone. The lower group of landings includes floors one to four and the upper group of landings includes floors fifteen to nineteen. An express zone extends from the fourth floor to the fifteenth floor. In this express zone the elevator car does not stop.

In the present case, a component which duplicates a component shown in my aforesaid patent is identified by the same reference character used for the component in the patent. For convenience, the following list of components is presented which are employed both in my aforesaid patent and in the present application:

1—elevator motor
3—penthouse floor
5—traction sheave
7—elevator brake
9—idler sheave
11—elevator car
13—hoistway
15—counterweight
17—ropes
19—hoistway door
21—car gate
1C—car call button (first floor)
UPB—up pushbotton
DPB—down pushbotton
2U—up pushbotton (second floor)
2D—down pushbutton (second floor)
1UL, 2UL, 1DL, 2DL, 3L—inductor relays
P—inductor plate
AM—advance motor
SG—transmitter
SM—synchronous motor
43, 45—carriage units
1FSU—up floor stop unit (first floor)
LFSD—down floor stop unit (first floor)
43S, 45S—synchronous carriages
43A, 45A—advance carriages
UPL—up pawl relay
DPL—down pawl relay
175—worm wheel
179—worm
191—tubular core
193—coil
195—armature disc FIGURE 1 is similar to FIGURE 1 of my aforesaid patent with the following exceptions: In the present case the hoistway 13 and the roping is arranged to permit travel of the elevator car through a distance corresponding to the nineteen landings or floors instead of nine landings as provided in my patent. Inasmuch as the present elevator car is arranged to serve the first to the fourth landings and the fifteenth to the nineteenth landings, the car call buttons in the elevator car 11 are provided for these landings. For clearance purposes which will be apparent from the following discussion the motor SM and some associated driving components are elevated slightly.

Figure 2:
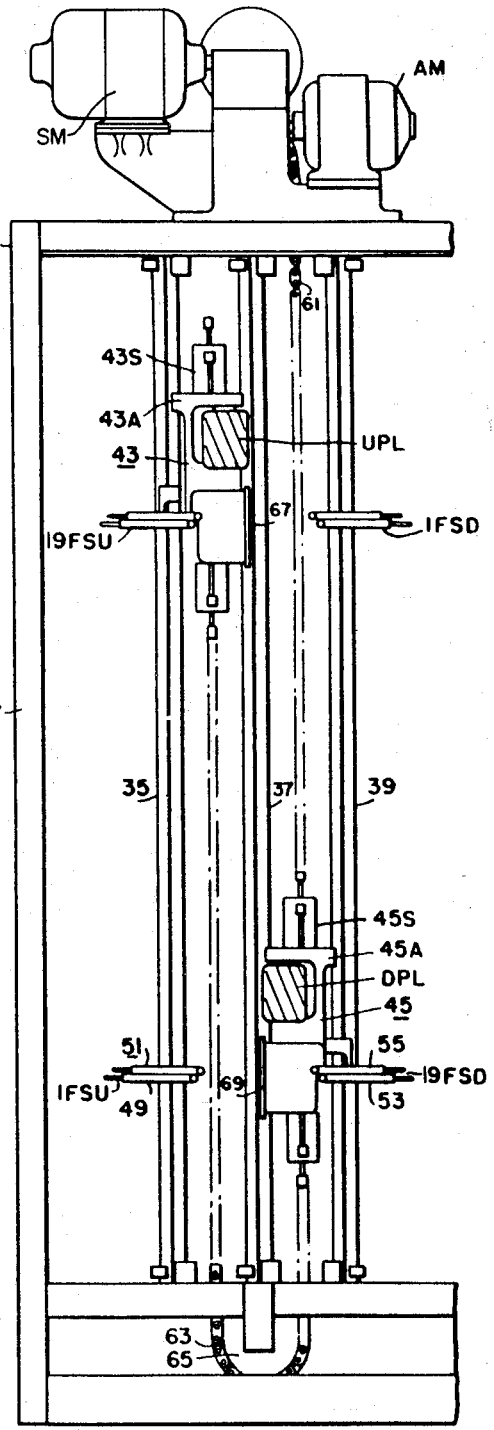
FIG. 2 is a view in front elevation of a floor selector employed in the system of FIG. 1.
Figure 3:
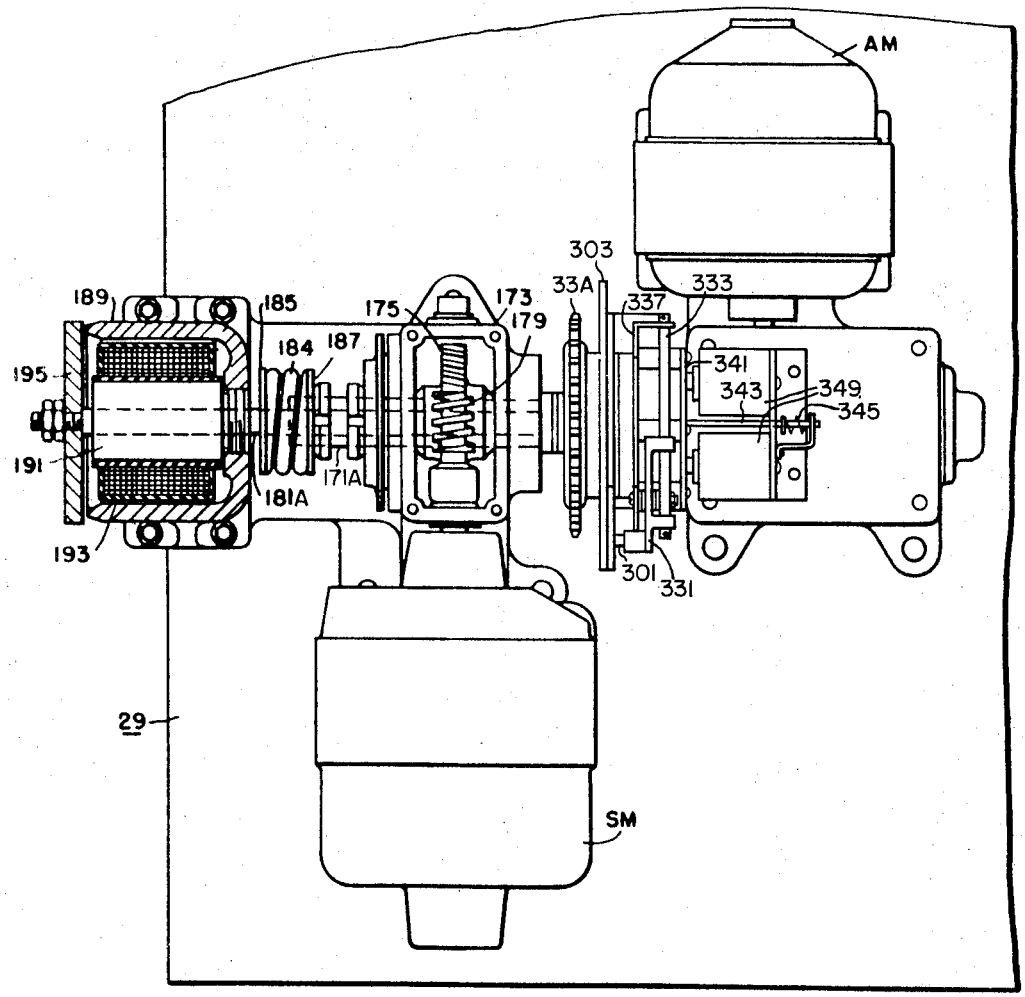
FIG. 3 is a view in top plan with parts broken away of the floor selector of FIG. 2.

The present FIG. 2 is similar to FIG. 3 of my aforesaid patent with the following exceptions. As previously pointed out the motor SM and certain associated components are elevated for clearance purposes. Inasmuch as the building here is assumed to have nineteen landings or floors, the floor stop units 19FSU and 19FSD for the highest floor are associated with the nineteenth floor instead of the ninth floor as in my aforesaid patent.

The present FIG. 3 is based on FIG. 10 of my aforesaid patent. The only differences are as follows:

The sprocket wheel 33A shown in FIG. 3 is coupled to the synchronous carriages 43S and 45S through a chain in the same manner shown for the sprocket wheel 33 in my aforesaid patent. However, in the present case the sprocket wheel 33A is coupled to the motor SM through a lost-motion coupling. The lost-motion coupling includes a driving member 301 and a driven member 303 which are mounted for rotation independently of each other about the axis of the sleeve 171A. The driven member 303 is secured to the sprocket wheel 33A for rotation therewith as a unit. The driving member 301 is coupled to the sleeve 171A for rotation therewith through a clutch which is released in response to energization of the coil 193.

Figure 4:
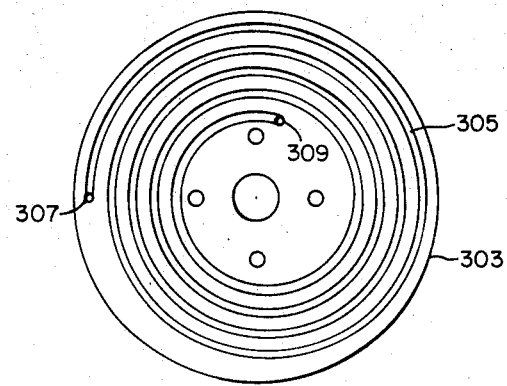
FIG. 4 is a view in elevation of a driven member employed in the floor selector of FIG. 2.
Figure 5:
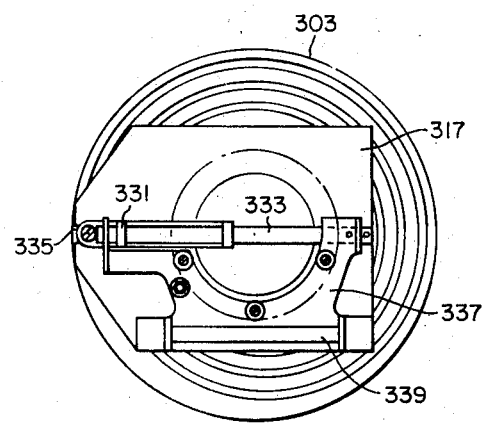
FIG. 5 is a view in elevation of the driven member of FIG. 4 in association with a driving member as employed in the floor selector of FIG. 2.
Figure 6:
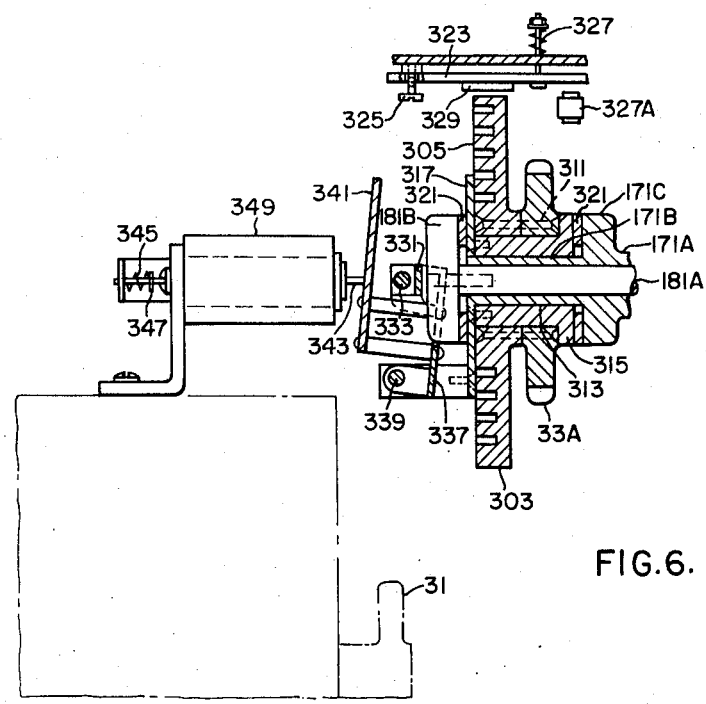
FIG. 6 is a view in section of a lost-motion coupling device employing the members of FIG. 5 in the floor selector of FIG. 2.

As shown more clearly in FIGS. 4 and 6, the driven member 303 preferably comprises a disc having a spiral groove 305 in one face. The outer end of the spiral groove may terminate in a socket or cylindrical hole 307 which extends through the disc. Similarly, the inner end of the spiral groove 305 terminates in a socket or hole 309 which may extend through the disc.

The disc 303 and the sprocket wheel 33A are connected together in any suitable manner for rotation as a unit as by rivets 311. This unit is concentric with and rotatable relative to a tubular element 313 having a flange 315 at one end thereof. The other end of the tubular element 313 is provided with a flange in the form of a plate 317 which is fastened to the tubular element in any suitable manner as by screws.

The tubular element 313 with its flanges 315 and 317 form a spool which is essentially concentric with and rotatable relative to an extension 171B of the sleeve 171A. The spool is mounted between a flange 171C formed on the sleeve 171A and a head 181B formed on the end of the shaft 181A. The head 181B and the flange 171C form plates of a clutch which are biased towards each other by the spring 184 (FIG. 3) for the purpose of coupling the spool for rotation with the sleeve 171A. When the coil 193 is energized this clutch is released to permit independent rotation of the spool relative to the sleeve. Clutch discs 321 of asbestos composition or other suitable friction material may be interposed between the spool and the clutch plates.

When the elevator car is in its express zone the disc 303 preferably is maintained in a stopped condition by a suitable brake. This brake may take the form of an iron lever or armature 323 having one end pivotally secured to the supporting structure by a screw 325 and having its other end biased away from the disc by a spring 327. The lever is urged towards the disc 303 by energization of a solenoid coil 327 which attracts the iron of the lever 323. A pad of leather or suitable other friction material 329 may be attached to the lever 323 for the purpose of engaging the disc 303 when the lever is in braking position.

Returning to FIGURE 3, the male coupling unit 301 preferably is in the form of a pin proportioned for snug entry into one of the sockets 307 or 309. This pin is mounted on a carriage 331 which is slidable along a shaft 333. The axis of the shaft extends transversely to and intersects the axis of the disc 303. Consequently the pin 301 is radially movable relative to the disc axis.

The pin is guided in such movement by a radial slot 335 provided in the plate 317. It will be noted that the pin extends through this slot.

The pin is mounted for movement into and out of the associated sockets 307 and 309. To this end the shaft 333 is mounted on a lever 337 which is pivotally mounted on a shaft 339 secured to the plate 317. This lever 337 carries an armature 341 of soft magnetic material such as steel.

As shown in FIG. 6, the armature 341 is engaged by a pin 343 which extends along the axis of rotation of the disc 303. This pin is biased towards the right as viewed in FIG. 6 by a spring 345. The spring is compressed between a supporting structure and a disc 347 secured to the pin 343.

With the parts in the position illustrated in FIG. 6 and FIG. 3, the pin 301 is snugly received within the outer socket 307. Consequently, rotation of the synchronous motor SM is accompanied by corresponding rotation of the disc 303. As long as the parts remain in the positions shown in FIG. 6 the present floor selector operates in precisely the same manner as the floor selector of my aforesaid patent.

In order to uncouple the driving and driven members of the lost-motion coupling during the transit of the elevator car through the express zone, solenoid coils 349 are energized to attract the armautre 341 in a counterclockwise direction as viewed in FIG. 6. Such attraction removes the pin 301 from the socket 307 and positions the end of the pin for entry into the spiral groove 305. At the same time the solenoid 327 is energized to apply the brake pad 329 against the disc 303, and the disc 303 together with the sprocket wheel 33A being decoupled from the driving pin 301 remain stationary during transit of the elevator car through the express zone.

During the transit of the elevator car through the express zone the driving member of the lost-motion coupling as represented by the pin 301 continues to rotate about the axis of the sleeve 171A with the end of the pin riding in the spiral groove. As the pin traverses the spiral groove it and its carriage 331 move radially inward along the shaft 333 until the elevator car nears the end of the express zone and the pin nears the end of the associated spiral groove. At this time, the solenoid coils 327 and 349 are deenergized. The spring 345 urges the end of the pin 331 against the bottom wall of the groove 305 until the pin reaches the socket 309 whereupon the spring urges the pin into the socket to effect a direct coupling between the driven and driving members of the lost-motion coupling. As long as this relationship exists the floor selector of the present application works in the same manner as the floor selector of my aforesaid patent.

Figure 7:
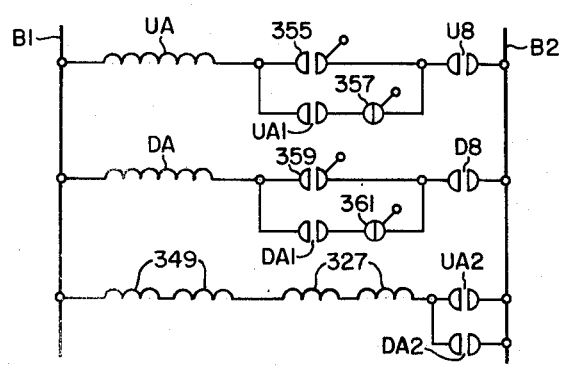
FIG. 7 is a schematic view in straight line form of circuits employed in controlling the lost-motion device employed in the floor selector of FIG. 2.

The energization of the solenoid coils 327 and 349 will now be considered with particular reference to FIGURE 7. In this figure the busses B1 and B2 represent a source of direct current.

In my aforesaid patent I disclose an up switch U and a down switch D, each having seven sets of contacts. For present purposes an additional set of make contacts U8 and D8 respectively, is added for each of these switches.

As the elevator car leaves the first landing or floor on an up trip the up switch is picked up and the make contacts U8 are closed. As the elevator car leaves the fourth landing or floor to enter the express zone, it momentarily closes a switch 355 which is biased to open condition to complete with the contacts U8 an energizing circuit for the relay UA. Pick up of the relay UA is accompanied by closure of the make contacts UA2 of this relay to energize the solenoid coils 327 and 349. The energized coils 349 remove the pin 301 from the associated socket and the solenoid coils 327 apply the brake to the disc 303 for the purpose of maintaining the synchronous carriages 43S and 45S stationary during transit of the elevator car through the express zone.

In addition the pick up of the relay UA closes make contacts UA1 to establish with a switch 357 a holding circuit around the switch 355. The switch 357 is biased to the closed condition and is momentarily actuated to open condition as the elevator car approaches the end of the express zone.

When the switch 357 is opened the relay UA drops out to open its make contacts UA1 and UA2. Opening of the make contacts UA2 deenergizes the solenoid coils 349 and the spring 345 is now free to bias the pin 301 against the bottom wall of the associated spiral groove 305.

At the same time the solenoid coils 327 are disconnected from the associated busses for the purpose of releasing the brake from the disc 303. If the system friction is insufficient to assure that the synchronous carriages will remain stationary until the pin 301 reaches the end of the spiral groove, the coils 327 may be designed to delay drop-out of the lever or armature 323 for a time sufficient to permit movement of the pin to the end of the spiral groove. When the pin reaches the end of the spiral groove it drops into the associated socket to provide a direct drive between the driving and driven members of the lost-motion coupling.

When the elevator car leaves the nineteenth floor on a down trip the down switch D is picked up to close its make contacts D8. As the elevator car leaves the fifteenth floor to enter the express zone a switch 359 is momentarily closed to complete an energizing circuit for the relay DA. This relay closes its make contacts DA2 for the purpose of energizing the solenoid coils 327 and 349. These operate in the manner previously described to stop movement of the synchronous carriages during transit of the elevator car on a down trip through the express zone.

In addition the relay DA closes its make contacts DA1 to complete with a switch 361 a holding circuit around the switch 359. The switch 361 is biased toward closed condition and is momentarily opened as the elevator car nears the ends of the express zone during a down trip. When the switch 361 opens the resultant drop-out of the relay DA opens the make contacts DA2 to deenergize the solenoid coils 327 and 349. These operate in the manner previously described to restore the direct coupling of the driving and driven members of the lost-motion coupling as the elevator car reaches the end of the express zone during a down trip.

The switches 355, 357, 359 and 361 are position-responsive switches which may be located in the hoistway for operation by cams mounted on the elevator car or which may be located on the landing or floor selector rails 35, 39 for operation by cams mounted on the advance carriages 43A, 45A. Alternatively, they may be magnetically-operated switches or switches operated by interruption of light beams. Such switches are well known in the art.

In a commercially available floor selector each revolution of the sleeve 171A corresponds to a car travel of 108 feet and a synchronous carriage travel of 13½ inches. For this selector the invention permits a reduction in height of the selector of approximately 13½ inches for each 108 feet of express zone.

Since all landings at one end of the express zone are served with the drive pin 301 in one hole in the disc 303, and all floors or landings at the other end of the express zone are served with the drive pin in the other hole or socket in the disc, the device is accurate. Synchronism is not a problem and does not effect the accuracy. The parts such as the synchronous carriages, chain and sprockets are light and travel slowly so the forces are low.

The landings at each end of the express zone are spaced by the advance distance. The length of the spiral groove is equal to the express zone length less the advance distance. Trips between landings at either end of the express zone are made in the manner discussed in the aforesaid patent. When a trip is made from a landing adjoining the express zone through the express zone, the solenoid coils preferably are energized before the car starts. The advance carriages advance and the car starts normally. However, the synchronous carriages do not move. The drive pin 301 moves along the groove 305. If a call is registered for the landing adjoining the express zone on the far side, the advance carriage pawls at the landing. The solenoid coils are deenergized. The drive pin 301 continues to move along the spiral groove 305 until it reaches the end. The drive pin 301 then drops into its associated socket and drives the disc 303 and the sprocket 33A, the synchronous carriages move to the center. The brake releases the disc. It should be noted that a weak brake action is employed. Consequently, if the drive pin 301 drops into one of its sockets before release of the brake, the pin can drive the disc 303 through the brake without difficulty. The elevator car stops at the landing in the manner discussed in my aforesaid patent.

If a call is not registered for the floor adjoining the express zone on the far side, the advance carriages are brought gently to a stop against the synchronous carriages where they remain while the express-zone device operates. When the synchronous carriages move, the advance carriages also move. The appropriate advance carriage then pawls at the landing from which a call is registered and the car makes a stop in the manner discussed in my aforesaid patent.

If a trip is made from a landing not adjoining the express zone, the selector advances and the car starts in the manner discussed in my aforesaid patent. A short distance before the advance carriages reach a landing adjoining the express zone on the near side, the release magnet and the brake magnet are energized. The synchronous carriages now stop. The advance carriages are brought gently to a stop against the synchronous carriages where they remain while the express-zone device operates. The synchronous carriages then move together with the advances carriages until they make a stop at a landing for which a call is registered in the manner set forth in my aforesaid patent.

What is claimed is:

1. A transport system comprising a structure having a plurality of landings, a vehicle, means mounting the vehicle for movement relative to the structure in a first path having first and second parts and having a third part intermediate the first and second parts, for serving said landings, each of said first and second parts having plural landings, motive means for moving the vehicle in said path, and control means for controlling the motive means to move said vehicle and for stopping the vehicle at preselected landings, said control means comprising a device comprising a mounting and an element supported for movement relative to the mounting in a second path, having first and second spaced portions, actuating means for moving said element in said first and second portions in accordance with motion of said vehicle substantially during transit of the vehicle through said first and second parts respectively, said actuating means including means for maintaining said element substantially stopped during transit of the vehicle through said third part, and control means responsive to the position of said element for controlling the movement of the vehicle, wherein said actuating means comprises a driven member, a driving member for driving said driven member, means for driving said driving member in accordance with motion of said vehicle, means coupling said driving member to said driven member during transit of the vehicle through said first and second parts and uncoupling said driving and driven members during transit of the vehicle through said third part, wherein one of said members comprises a male coupling unit and the other of said members comprises a female coupling unit having two spaced socket areas each proportioned for snugly receiving said male coupling unit in coupling relationship, and coupling control means responsive to movement of the vehicle for maintaining the male coupling unit in coupling relationship in a first one of the socket areas during transit of the vehicle through the first part and for moving the male coupling unit to the second one of the socket areas substantially during transit of the vehicle from the first part to the second part, said coupling control means maintaining said male coupling unit in coupling engagement with the second one of the socket areas substantially during transit of the vehicle through the second part.

2. A transport system as claimed in claim 1, wherein said female coupling unit comprises a groove area for guiding the male coupling unit between said socket areas.

3. A transport system as claimed in claim 1, wherein the female coupling unit comprises a disc, said disc and male coupling unit being mounted for independent rotation about a common axis, said disc having a spiral groove area in a first face extending between said socket areas for guiding the male coupling unit between the socket areas, means yieldably biasing the male coupling unit towards the first face of the disc for entry into each of said areas when aligned therewith, and electroresponsive means effective when energized while the male coupling unit is in either of said socket areas for moving the male coupling unit against said biasing to release the male coupling unit from the engaged socket area sufficiently to enter said groove area, said male coupling unit being mounted for movement in a radial direction to facilitate tracking thereof along the groove area.

4. A transport system as claimed in claim 3, wherein said landings are vertically spaced from each other, said vehicle comprises an elevator car mounted for vertical movement, said third part comprises an express zone extending past a plurality of the landings, a landing selector having a supporting structure and a carriage mounted for movement relative to the supporting structure, said control means being controlled by the position of said carriage for controlling the stopping of the elevator car at selected landings, means coupling the carriage for movement in accordance with rotation of said disc, means for energizing said electroresponsive means substantially as said elevator car enters said express zone, and means for deenergizing said electroresponsive means substantially as said elevator car leaves said express zone.

5. A transport system as claimed in claim 4, in combination with means for braking said disc substantially while the elevator car is in the express zone.

6. An elevator system comprising a structure having a plurality of vertically-spaced landings, an elevator car, means mounting the car for movement relative to the structure in a first path having first and second parts and a third part intermediate the first and second parts for serving said landings, motive means for moving the car in said path, and control means for controlling the motive means to move said car and for stopping the car at preselected landings, said control means comprising a lost-motion device comprising a male coupling unit mounted for rotation relative to the structure about an axis, a female coupling unit mounted for rotation about said axis and having spaced socket areas for receiving snugly said male coupling unit, said female coupling unit having a guide extending between said socket area for guiding the male coupling unit therebetween, and actuating means for actuating the male coupling element from a position within one of the socket areas to a position permitting said guide to guide the male coupling element for reception in the other of the socket areas, means for moving a first one of said coupling units in accordance with movement of the car, means for coupling said coupling units through a first one of the socket areas while the car is in the first part of the path, and through a second one of the socket areas while the car is in the second part of the path and for decoupling said decoupling units while the car is in the third part of the path, and means responsive to movement of a second one of the coupling units for controlling the operation of the car in the first and second parts of the path.

7. A device as claimed in claim 6, in combination with drive means and releasable clutch means for coupling the drive means to one of the coupling units.

8. A device as claimed in claim 6, wherein said female coupling unit comprises a disc, said disc having a spiral groove extending between the socket areas to receive and guide the male coupling unit between said socket areas, said male coupling unit being movable radially to permit it to follow said groove.

9. A device as claimed in claim 8, in combination with means resiliently biasing the one of the coupling units towards one of the coupling and uncoupling positions relative to the other of the coupling units, and electroresponsive means effective when energized for actuating the biasing one of said coupling units away for the biasing position thereof to alter the coupling of the coupling units.

10. A device as claimed in claim 9, in combination wtih spring-biased, electromagnetically actuated brake means for braking one of said coupling units.

References Cited
UNITED STATES PATENTS 2,482,458    9/1949    Bouton _____ 187—29

ORIS L. RADER, Primary Examiner

W. E. DUNCANSON, Jr., Assistant Examiner